No. 664,708. Patented Dec. 25, 1900.
W. S. ANDERSON.
ASH PAN.
(Application filed Jan. 6, 1900.)
(No Model.)

WITNESSES:
H. Walker
2 B Owens

INVENTOR
William S. Anderson
BY Munn
ATTORNEYS

THE NORRIS PETERS CO., PHOTO-LITHO., WASHINGTON, D. C.

UNITED STATES PATENT OFFICE.

WILLIAM S. ANDERSON, OF JASPER, TENNESSEE.

ASH-PAN.

SPECIFICATION forming part of Letters Patent No. 664,708, dated December 25, 1900.

Application filed January 6, 1900. Serial No. 613. (No model.)

*To all whom it may concern:*

Be it known that I, WILLIAM S. ANDERSON, a citizen of the United States, and a resident of Jasper, in the county of Marion and State of Tennessee, have invented a new and Improved Ash-Pan, of which the following is a full, clear, and exact description.

The object of this invention is to provide an ash-pan for use beneath grates when the fire is burning and which may be conveniently and readily handled without fear of accidentally spilling its contents and permitting dust and sparks to fly therefrom with the wind, which end I attain by providing a cover for the pan which is fitted with devices removably engaging the pan and by which the pan may be carried from one place to another and the cover disengaged when it is desired to dump the contents of the pan.

This specification is the disclosure of one form of my invention, while the claims define the actual scope thereof.

Reference is to be had to the accompanying drawings, forming a part of this specification, in which similar characters of reference indicate corresponding parts in both views.

Figure 1:
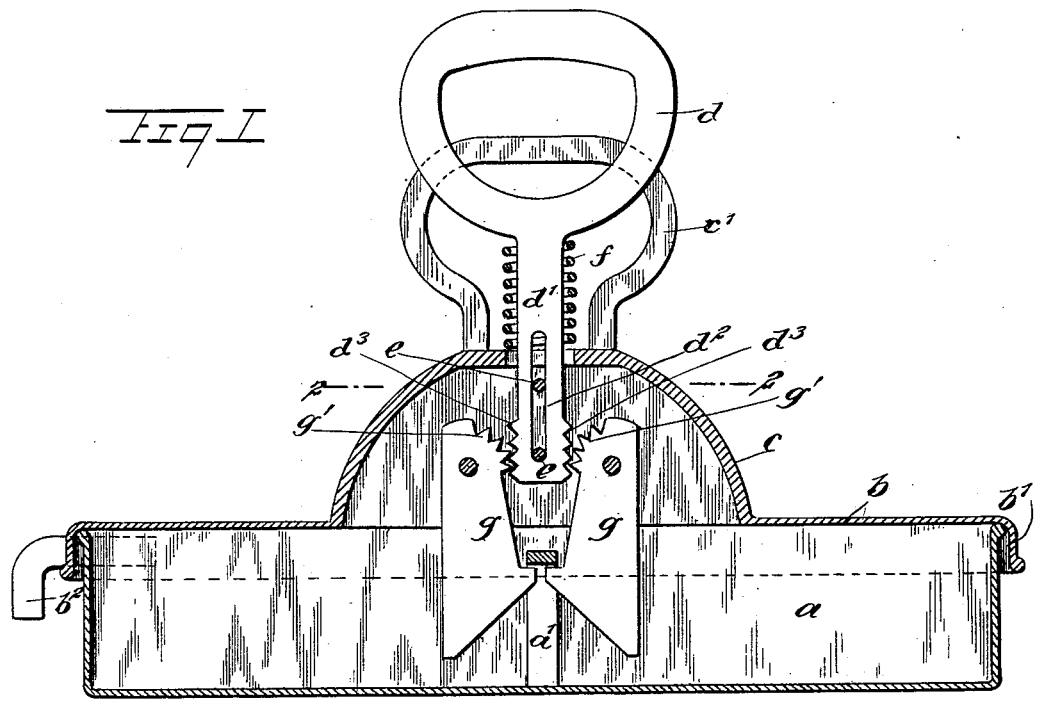
Figure 2:
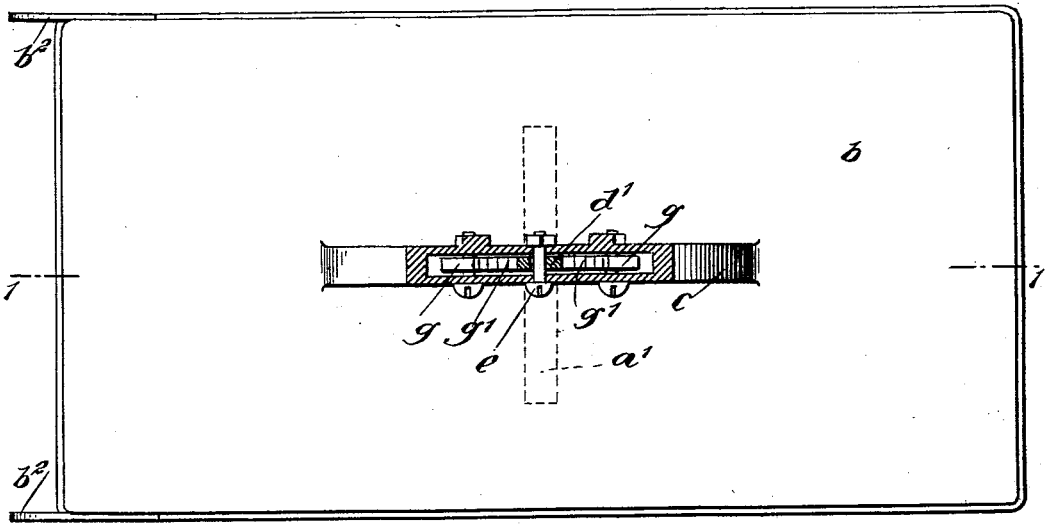

Figure 1 is a sectional view of the invention on the line 1 1 of Fig. 2, and Fig. 2 is a sectional plan of the invention upon the line 2 2 of Fig. 1.

The pan $a$ may be of any desired construction, except that it is provided at its middle portion inside of the pan with a bail $a'$, standing on the bottom thereof. To this pan I apply a cover $b$, which has at its edges downturned flanges $b'$ to take over the upper edges of the pan and which also has at one end of the cover hooks $b^2$, the purpose of which is to be engaged with the upper edge of the pan when the latter is in place beneath the grate, thus facilitating drawing out the pan in position to permit the attachment of the cover thereto, as will fully appear hereinafter.

Mounted on the cover $b$ is a housing $c$, which opens at the under side of the cover and which has a handle $c'$ attached rigidly thereto. A second handle $d$ is provided and formed with a shank $d'$, which extends through an opening in the top of the housing $c$ downward into the interior thereof and which is held to have limited reciprocating movement therein by means of one or more pins $e$ engaging in a longitudinally-disposed slot $d^2$ in the shank $d'$. An expansive spiral spring $f$ is placed on the shank $d'$ and bears between the top of the housing $c$ and the bottom of the handle $d$, tending to raise the handle to the position shown in Fig. 1. The lower end of the shank $d$ at each side is formed with gear-teeth $d^3$, respectively meshing with similar teeth $g'$ on dogs $g$, which are pivoted at their upper ends in the housing $c$ and which extend down below the cover $b$ in position to engage with the bail $a'$ of the pan $a$. The parts are held in their normal position, which is that shown in Fig. 1, by means of the spring $f$, and by grasping the two handles $c'$ and $d$ and drawing the same together the shank $d'$ will be pushed down in the casing and the dogs $g$ will be thrown away from each other to disengage the bail. In using this invention, therefore, supposing that the pan $a$ is in place beneath the grate, a person desiring to remove the ashes should grasp the handle $d$ of the cover and engage the hooks $b^2$ with the pan, drawing the pan out, so that the cover may be placed thereon. The dogs are shaped to automatically engage with the bail when the cover is moved down on the top of the pan to the position shown in Fig. 1. This automatic operation of the dogs may be assisted by drawing the handles $c'$ and $d$ together, which separates the dogs and enables them to pass around the bail when the cover is placed on the pan. Then when the handles $d$ and $c'$ are released the spring moves the dogs to closed position. The pan and its cover may now be carried by the user grasping the handle $d$, and when it is desired to dump the pan the handles $d$ and $c'$ should again be drawn together, thus separating the dogs and permitting the cover to be lifted from the pan.

I desire it to be understood that various changes may be made in the size, proportions, and minor details of the invention without departing from the spirit of my invention, among which is the very obvious change of constructing the cover $b$ of standard sizes and using them in connection with a number of pans $a$ which may be of sizes different from that of the cover. For example, a household might be provided with a single cover which could be used in connection with the ash-pans of the various stoves, furnaces, and other fireplaces in the house.

Having thus described my invention, I claim as new and desire to secure by Letters Patent—

1. A cover for ash-pans, having a housing constructed thereon and opening on the under side of the cover, a handle rigidly attached to the housing, a second handle with a shank sliding in the housing and formed with gear-teeth, dogs pivoted in the housing and extending below the cover to engage a part of the ash-pan and having gear-teeth meshed with the shank, and a spring actuating the shank.

2. The combination of an ash-pan provided with a bail standing on the bottom thereof at approximately the center of the ash-pan, a cover arranged to extend over the top of the ash-pan, to close the same, a handle carried by the cover, to facilitate carrying the cover and pan, and releasable fastening devices carried by the cover at the center thereof, to engage the bail of the ash-pan, whereby to fasten the cover on the ash-pan and permit carrying the ash-pan through the medium of the cover.

3. An ash-pan cover arranged to sit on the top of the ash-pan, to close the same, and provided with a handle on the top at about its middle and also provided with releasable fastening devices situate on its under side at approximately the middle of the cover, to engage a part of the ash-pan at approximately the center thereof, whereby to fasten the cover in place and permit carrying the ash-pan through the medium of the cover.

4. An ash-pan cover, provided with a pivoted dog serving to engage a part of the ash-pan, to hold the cover in place and having teeth thereon, and a rack slidably carried by the cover and meshing with the teeth of the dog, to actuate the dog.

5. A cover for ash-pans, having a handle rigidly attached, a second handle sliding on the cover and having a shank with teeth thereon, and a pivoted dog mounted on the cover and adapted to engage a part of the ash-pan, the dog having teeth with which the teeth of the shank of the handle mesh.

6. The combination with an ash-pan provided with a bail at its middle portion inside of the pan, of a cover for closing the pan, releasable fastening devices carried by the cover at the center thereof to engage the bail, and a handle having a shank slidably mounted on the cover to actuate the fastening devices, the said fastening devices being held in engagement with the bail when the handle is grasped and lifted, whereby the ash-pan and its cover may be readily carried.

In testimony whereof I have signed my name to this specification in the presence of two subscribing witnesses.

WILLIAM S. ANDERSON.

Witnesses:
H. D. HALL,
F. W. LELAND.